Sept. 6, 1932.  L. C. SOILEAU, JR  1,875,514
FEED CUTTER
Filed May 19, 1931  3 Sheets-Sheet 1
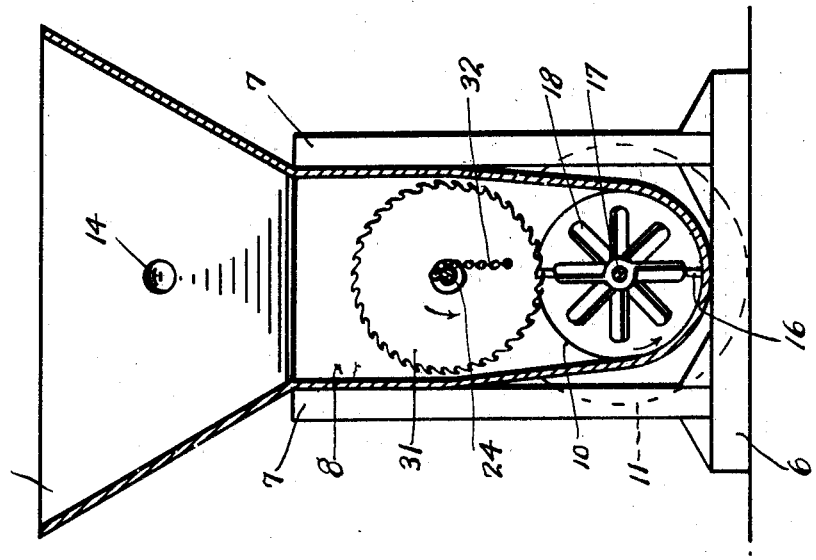
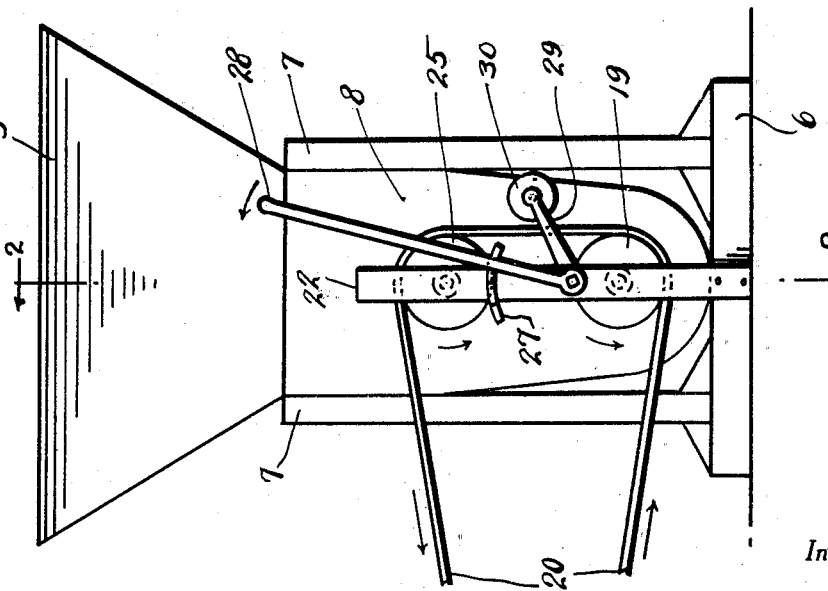
Inventor
Louis C. Soileau, Jr.
By Clarence A. O'Brien
Attorney

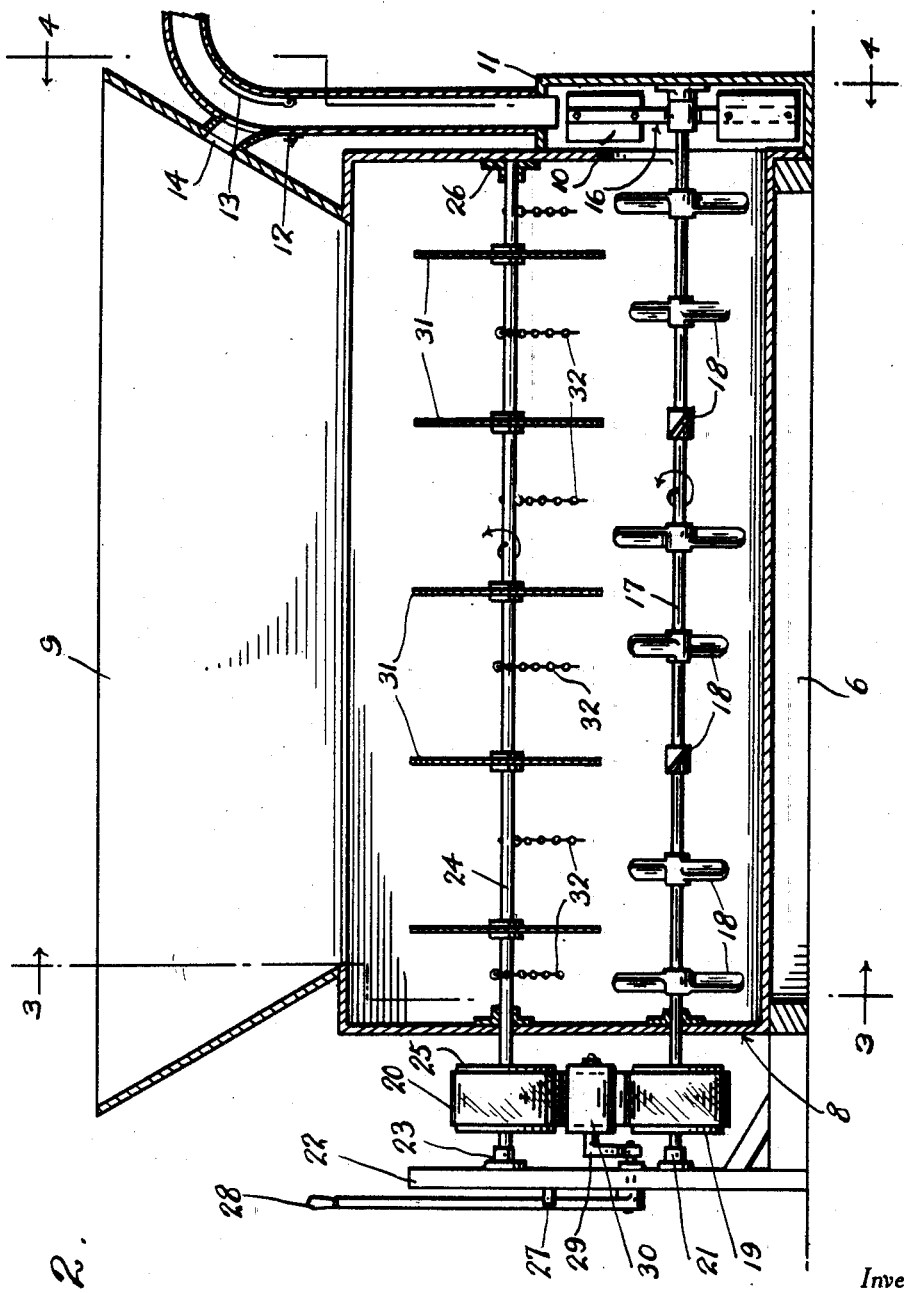

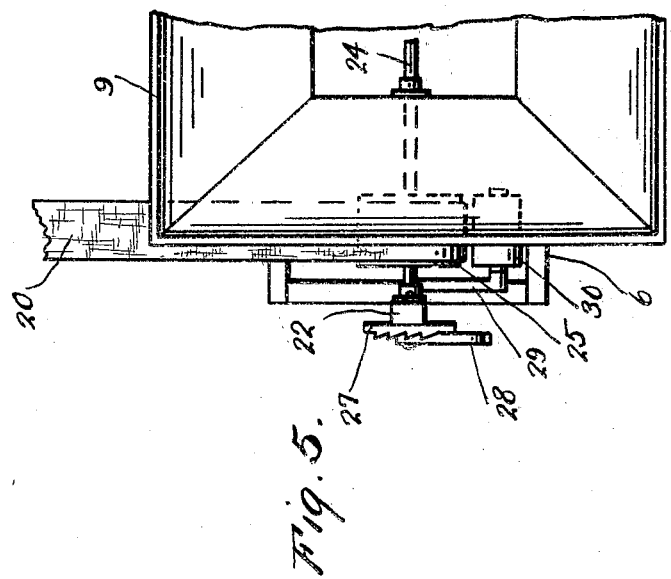
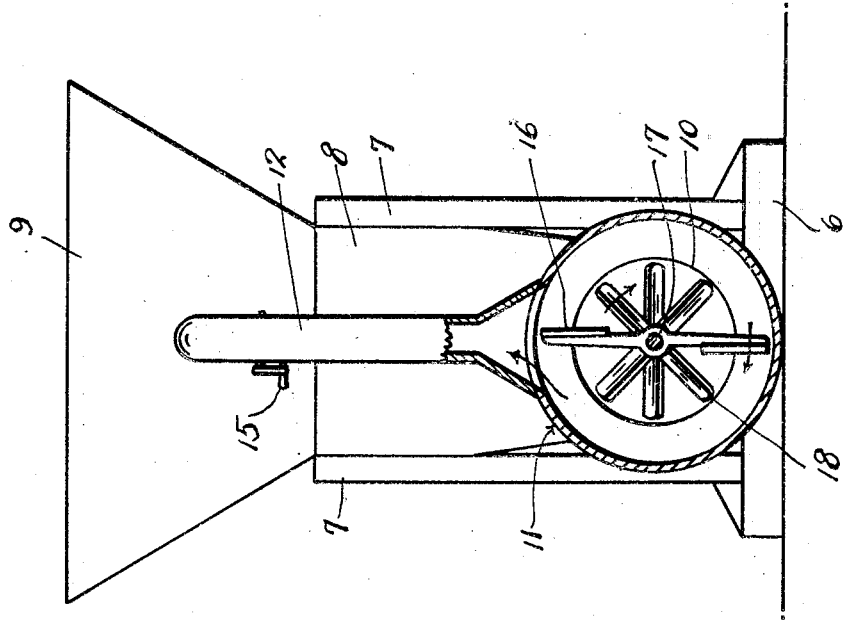

Patented Sept. 6, 1932

1,875,514

UNITED STATES PATENT OFFICE

LOUIS C. SOILEAU, JR., OF RAYNE, LOUISIANA

FEED CUTTER

Application filed May 19, 1931. Serial No. 538,510.

This invention relates to a machine which may be broadly referred to as a feed cutter, and more specifically defined as an accessory for use in association with a hammermill or feed crusher. My improved machine is expressly constructed and designed for severing, shredding and mixing various kinds of stock feeds such as soy beans, rice straw and the like.

Briefly stated, the machine is characterized by a casing constituting a receiver and having an appropriate delivery hopper, means in said casing for conditioning and mixing the feed, and a fan-equipped elevating conduit for conveying the mixed material to a suitable point of deposit, such as for example, an associated hammer mill.

One feature of the invention is predicated upon the utilization of a gang saw arrangement including rotary disc saws of a caliber frequently referred to in the trade as cord wood saws, these being arranged just beneath the hopper so as to permit the material to be severed to be literally dumped into the hopper and to drop onto the saws for severing and shredding.

Another feature of the invention is based on the use of an underlying rotary agitator and conveyor device disposed beneath the saws, operable in unison with said saws, and operatively connected at one end with a mixed material discharging saw.

Other features and advantages of the invention will be made clear from the following description and drawings.

In the drawings:

Figure 1 is an end elevational view of a machine constructed in accordance with the the present inventive conception.

Figure 2 is a vertical longitudinal sectional view on the line 2—2 of Figure 1.

Figure 3 is a transverse vertical section on the line 3—3 of Figure 2.

Figure 4 is an irregular section and elevation on the line 4—4 of Figure 2.

Figure 5 is a top plan view of one end portion of the machine.

Referring to the drawings by distinguishing ordinals or reference characters, it will be observed that the support comprises a suitable base frame 6 having perpendicular uprights 7 located at corner portions thereof, and embracing the end portions of a vertically and longitudinally elongated casing 8 which constitutes an air-tight material receiver and conditioning device.

The numeral 9 designates a suitable material placement hopper. The right hand end wall of the receiver casing is formed with a discharge opening 10 registering with a suitably proportioned and shaped fan housing 11. Extending up from this fan housing is an elevating pipe or conduit 12 whose discharge end is adapted to be connected with a hammermill or feed crusher (not shown).

At the elbow portion of this pipe is an internal gauge valve 13 of a two-way type. When in the position shown in Figure 2, it provides connection of the fan housing 11 with the hammermill and simultaneously affords communicating connection with the adjacent end of the hopper 9 by way of a short connecting neck 14. Suitable external control means 15 (see Figure 4) is arranged for actuating this valve to permit it to be regulated and to permit the treated material to be either entirely shunted through the neck 14 and back into the hopper or allowed to pass simultaneously through said neck and pipe 12.

Mounted in the housing 11 is a suitably constructed rotary fan 16 this being carried by a horizontal shaft 7 journalled for rotation in appropriate bearings. The shaft 17 is provided with longitudinally spaced spirally arranged duplex blades 18. These blades constitute beaters and co-operate with one another in forming a sort of a spiral conveyor for delivering the cut and mixed material from the bottom of the receiver into the housing 11.

On the extending left hand end of the shaft 17 is a pulley 19 over which a belt 20 is trained. Incidently this end of the shaft is mounted in a bearing 21 carried by an upstanding post 22. Mounted in a bearing 23 on the same post is a superposed horizontally disposed rotary shaft 24 whose extended left hand end is provided with a companion pulley 25 over which the main belt 20 is trained.

The opposite end of this shaft 24 is mounted for rotation in a bearing 26 at the right hand end of the receiver. In connection with this pulley assembly and post structure, I call attention to a rack 27 mounted on the post with which a belt tightener lever 28 is co-operable. Incidently, the lever is rockably mounted on the post and carries a crank 29 which in turn carries a supplemental small pulley 30 which bears against the adjacent flight of the belt.

Mounted on that portion of the shaft 24 within the upper half of the casing 8 are disc saws 31 of a size such as are generally applied for cord wood sawing. These saws are rigidly mounted on the shaft for rotation therewith and located between the various saws and attached to the shaft are chains 32. These chains are designed for two purposes; namely, to aid in keeping the saws clean by a whipping action, and to serve as agitating elements to aid in loosening and mixing the material which is severed by the saws.

In practice, it is evident that the material to be acted on is placed in the hopper 9 in appropriate bundles and lengths. In fact, it is literally dumped into this hopper. These bundles of material drop into the receiver and against the saw and when the shafts 17 and 24 are set into rotation by the belt and pulley constructions, it is obvious that the material is cut into short lengths and is then reacted on by the beater and conveyor blades 18. It is thus reduced to the desired shredded consistency and is fed from the bottom of the receiver by the conveyor blade 18 and into the housing 11.

Here it is acted on by the fan and is blown up through the valved pipes into the hammermill or back into the hopper 9 according to the position of the valve.

This machine, as will be evident to those skilled in the art to which the invention relates, is sturdy and dependable and susceptible of fulfilling the severing and mixing action in a highly satisfactory manner. The ratio of pulleys may be varied to regulate the relative speed of the shafts 17 and 24 with relation to one another if desired. In fact, gearing might be substituted here for simultaneously operating said shafts in proper timed relation.

In any event, it has been satisfactory to arrange the conveyor in a vertically spaced position just beneath the cutter and to make the cutter from rotary saws with intervening slapping and saw-cleaning chains.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a feed cutter and mixer of the class described, a casing including a hopper, a horizontal lower shaft in the lower portion of the casing provided with longitudinally spaced spirally arranged blades functioning as conveyor elements as well as beaters, and a rotary cutter in the upper portion of the casing including a shaft mounted directly above said first-named shaft and provided with longitudinally spaced rotary disc saws, and combined beater and saw cleaning elements on said second shaft.

2. In a feed cutter and mixer of the class described, a casing including a hopper, a horizontal lower shaft in the lower portion of the casing provided with longitudinally spaced spirally arranged blades functioning as conveyor elements as well as beaters, and a rotary cutter in the upper portion of the casing including a shaft mounted directly above said first-named shaft and provided with longitudinally spaced rotary disc saws, and intervening chains anchored at one end and constituting agitating elements and saw cleaning elements.

In testimony whereof I affix my signature.

LOUIS C. SOILEAU, Jr.